United States Patent [19]

Grunstad et al.

[11] 4,047,637
[45] Sept. 13, 1977

[54] PAPER CLIP DISPENSER

[75] Inventors: Jerome A. Grunstad, West St. Paul; Richard G. Eischens, Edina, both of Minn.

[73] Assignee: Minnesota Mining and Manufacturing Company, St. Paul, Minn.

[21] Appl. No.: 747,361

[22] Filed: Dec. 3, 1976

[51] Int. Cl.² .................. B65H 3/66; G07F 11/24
[52] U.S. Cl. ................. 221/265; 206/340; 206/350; 206/818; 312/971
[58] Field of Search .............. 209/111.8; 221/186, 221/212, 263, 265, 277; 223/109 A; 312/97.1; 206/123, 44.12, 336, 338, 340, 348, 350, 409, 533, 818

[56] References Cited

U.S. PATENT DOCUMENTS

| 1,111,946 | 9/1914 | Byrd | 221/187 |
|---|---|---|---|
| 1,483,700 | 2/1924 | Waple | 221/263 |
| 1,613,622 | 1/1927 | O'Malley | 221/192 |
| 1,693,458 | 11/1928 | Patterson | 221/265 |
| 1,703,352 | 2/1929 | Moore | 221/135 |
| 2,234,868 | 3/1941 | Laudien | 221/265 |
| 2,439,697 | 4/1948 | Scott | 221/186 |
| 2,457,421 | 12/1948 | Warren | 223/109 A |
| 2,848,006 | 8/1958 | Simpson | 206/818 |
| 2,950,841 | 8/1960 | Cornwell | 221/263 |
| 3,587,835 | 6/1971 | Shore | 206/818 |
| 3,701,419 | 10/1972 | Hutter et al. | 209/111.8 |
| 3,704,991 | 12/1972 | Leedy | 206/350 |
| 3,731,415 | 5/1973 | Shore | 206/818 |
| 3,750,868 | 8/1973 | Cooper | 221/212 |

FOREIGN PATENT DOCUMENTS

| 2,336,899 | 6/1974 | Germany | 206/350 |

Primary Examiner—William Price
Assistant Examiner—Bruce H. Bernstein
Attorney, Agent, or Firm—Cruzan Alexander; Donald M. Sell; Philip A. Dalton, Jr.

[57] ABSTRACT

A dispenser for magnetizable articles such as pins or paper clips. The dispenser has inner and outer concentric, slotted cylinders, the first cylinder being rotatable within the outer cylinder for dispensing articles through the slots. A pair of spaced magnets establishes a magnetic field which intersects the path of the dispensed articles for suspending the articles in the field without the aid of mechanical supports.

6 Claims, 5 Drawing Figures

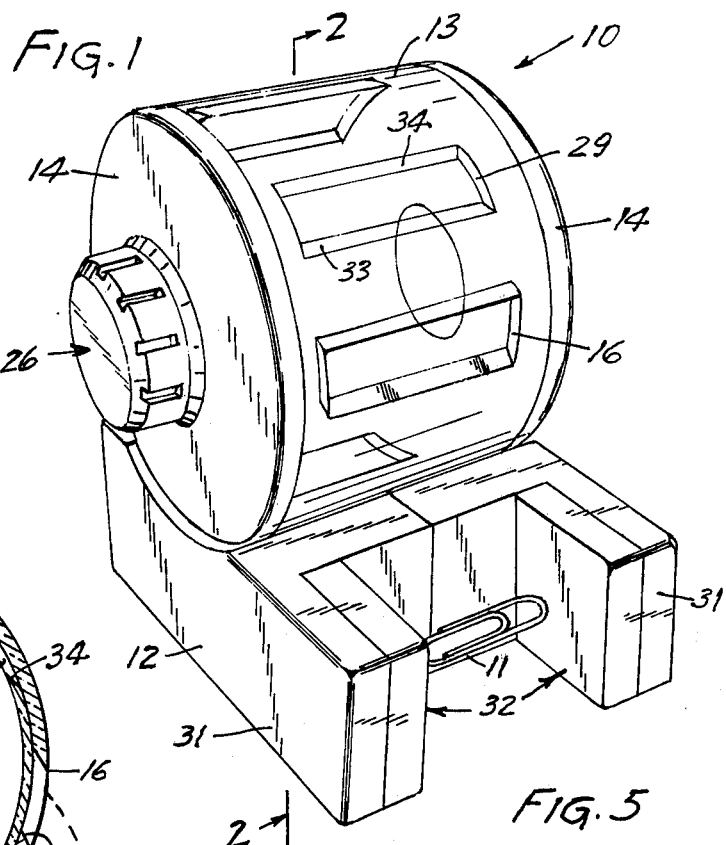
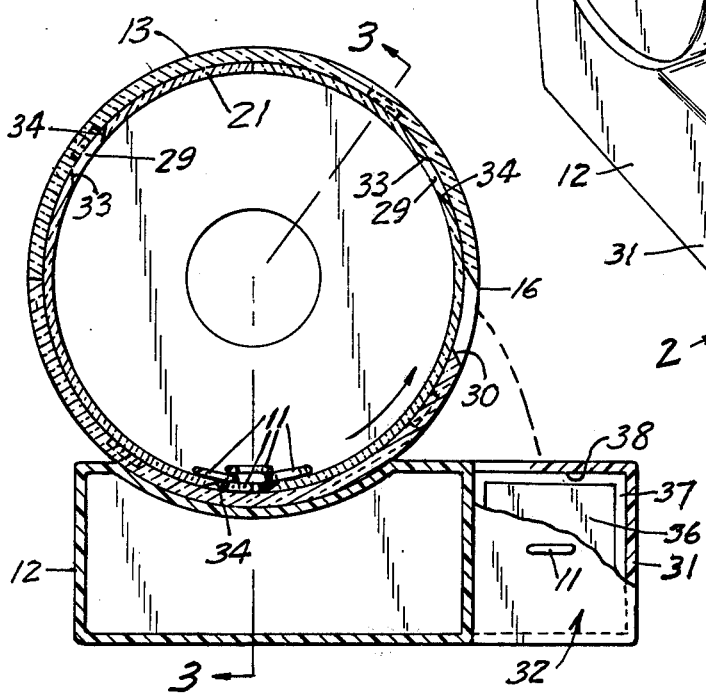
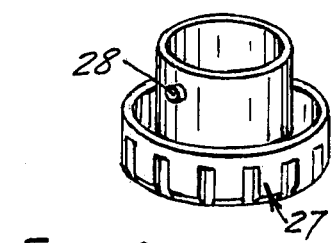
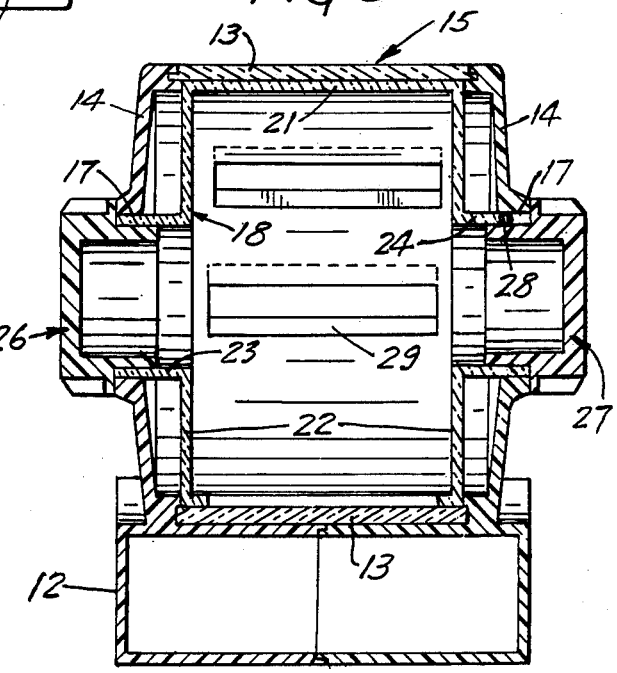
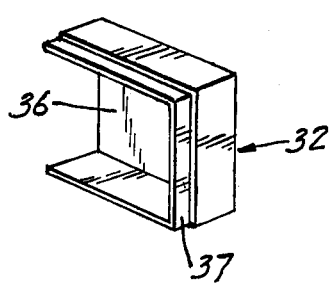

PAPER CLIP DISPENSER

BACKGROUND OF THE INVENTION

1. Field of the Invention

The invention relates to dispensing containers for magnetizable articles such as paper clips, hair pins, and pins and, in particular, to a container for dispensing the magnetizable articles and suspending the dispensed articles in magnetic field.

2. Description of the Prior Art

Various dispensers are available for small articles. Examples include containers having an opening and a ring magnet or a bar magnet for holding one or more magnetizable articles at the opening, as taught by U.S. Pat. No. 3,587,835 issued June 28, 1971 to Shore and U.S. Pat. No. 3,750,858 issued Aug. 7, 1973 to Cooper.

Dispensers also are available which use an inner rotatable cylinder or cylinder segment to dispense articles through a slot in an outer cylinder. The dispensed articles may be held in a trough, as taught by U.S. Pat. No. 1,613,622 issued Jan. 11, 1927 to O'Malley, or by U.S. Pat. No. 1,703,352 issued Feb. 26, 1969 to Moore. Also, U.S. Pat. No. 1,111,946, issued Sept. 29, 1914 to Byrd, utilizes a cylindrical receptacle having sloping inner walls for delivering magnetizable articles to openings in the receptacle and a magnet at each of the receptacles for holding the articles.

Thus, various containers and dispensers are available which facilitate the use of small magnetizable articles. However, access to the dispensed article typically is impeded by the relatively small dimensions of the dispenser opening and/or by the physical retention of the article against the dispenser opening, trough, magnet or the like.

SUMMARY OF THE INVENTION

The present invention provides a dispenser for magnetizable articles comprising a stationary cylindrical outer shell having an axial slot; a cylindrical article container rotatably mounted within the shell and having at least one axial slot for carrying articles to the shell slot and dispensing the articles through the shell slot one at a time upon rotation of the container; and magnetic means for establishing a magnetic field intersecting the paths of the dispensed articles to suspend the articles in the field.

BRIEF DESCRIPTION OF THE DRAWING

The invention will be more fully described in reference to the accompanying drawing, wherein:

FIG. 1 is a perspective view of a dispenser constructed according to the present invention;

FIG. 2 is a side sectional view taken along the lines 2—2 in FIG. 1 in the direction of the arrows with a portion of the base broken away to show the interior construction;

FIG. 3 is a front sectional view of the dispenser of FIG. 1 taken along the lines 3—3 in FIG. 2 in the direction of the arrows;

FIG. 4 is a perspective view of a base panel which has a magnet attached to its interior surface; and FIG. 5 is a perspective view of the detachable knob shown in FIG. 3.

DETAILED DESCRIPTION OF THE PREFERRED EMBODIMENT

The present invention provides a container which dispenses magnetizable articles one at a time and suspends the articles for presentment. FIG. 1 shows an exemplary embodiment of a dispenser 10 for magnetizable articles. Although the dispenser 10 is suitable for a variety of magnetizable articles, such as sewing pins and hair pins, hereafter the exemplary embodiment will be described in conjunction with paper clips 11.

The dispenser 10 comprises a base 12 which supports a stationary (non-rotatable) cylindrical shell 13, the ends of which are enclosed by circular end covers 14—14. Shell 13 has an axial slot 16 for dispensing articles. Referring to FIG. 3, at least one of the covers 14—14 has a circular aperture 17 (both covers are shown as having apertures) for mounting a cylindrical article container 18. Typically, these components are plastic.

Referring further to FIG. 3, the base 12, sleeve 13 and end covers 14—14 comprise an assembly 15 which may be disassembled for insertion or removal of the article container 18. In the embodiment shown, the base 12 is formed in two sections (see parting line in FIGS. 1 and 3) and each cover 14 is formed integrally with one of the base sections. The base-cover sections are assembled with the sleeve 13 by a press-fit arrangement. Alternatively, sonic welding may be applied to make the assembly permanent. Of course, this arrangement is illustrative only, for other ways of forming (and joining) the assembly 15 will be readily devised by those skilled in the art.

The container 18 has a cylindrical side wall 21, which is concentric with the shell 13, and circular end walls 22—22. The article container 18 may be an assembly or, as shown in FIG. 3, the side wall 21 and end walls 22—22 may be formed as one piece. The end walls 22—22 have outwardly extending hubs 23 and 24 which are journaled through the cover apertures 17—17, thereby mounting the container 18 for rotation within the assembly 15.

Knobs 26 and 27 are mounted to the hubs 23 and 24, respectively, for manually rotating the container 18. At least one of the hubs, hub 24, is hollow. That is, at least the hub 24 has an axial aperture or bore communicating with the interior of the container 18. A pin 28 which extends from knob 27 (FIG. 5) cooperates with a slot in the hub 24 to form a bayonet-slot arrangement for releasably attaching the knob to the hub. When the knob 27 is attached, the aperture of hub 24 is closed. With the knob 27 removed, paper clips 11—11 can be supplied to or removed from the container 18 via the hollow hub 24. In the illustrated embodiment, knob 26 is attached to hollow hub 23 by a simple press fit, and may be further secured by adhesive. Of course, a second knob 27 may be used in place of knob 26 or the dispenser 10 may be designed to use only the one knob, knob 27.

Referring to FIG. 2, container wall 21 has a plurality of axial slots 29—29 formed therein. Preferably, shell 13 and container wall 21 are made of transparent material such as plastic to permit viewing of the paper clips 11—11 and the positions of the slots 29—29. The slots 29—29 are sufficiently large to receive one paper clip 11. When an article-carrying slot is rotated in a counter-clockwise direction from a position at or near the bottom of the container as shown in FIG. 2, the slot 29 carries the article along the inner surface of the shell 13 to the shell slot 16. Leading edge 33 and trailing edge 34 of the slots 29—29 slope radially inwardly in the forward (counter clockwise) direction to facilitate picking up the articles.

Preferably, the sleeve slot 16 is located at or below the widest portion of the circular cross-section of the shell 13, so that the shell curves inwardly below the slot 16. Because of this arrangement, the paper clip 11 is held within the container slot 29 by gravity and by the forward-extending trailing edge 34 until the slot is aligned with the shell slot 16 and, then, the paper clip is compelled by gravity to fall through the shell slot. This gravity-aided dispensing is facilitated by the downward slope of the container slot 29 when this slot is aligned with the shell slot.

Referring to FIGS. 1 and 2, the base 12 has projecting members 31—31 which extend forwardly of the slot 16 and on either side of the gravity-induced path (shown dotted in FIG. 2) of the dispensed article. The exterior, facing sides of the projecting members 31—31 comprise panel members 32—32. In one embodiment, each panel 32 is a magnet. Alternatively, in the embodiment shown in FIG. 4, the panels 32—32 are non-magnetic and a magnet 36 is secured to the interior of each panel. Each of the panels has shoulders 37—37 which secure the panel by a press fit to a complementary-shaped opening 38 (FIG. 2) in member 31. When the panels 32—32 are in place as shown in FIG. 1, the magnets are concealed inside the members 31—31.

The magnets 36—36 cooperate to establish a magnetic field in the intervening space. This field intersects the gravity-induced path followed by the dispensed articles 11—11 in falling from the shell slot 16. The magnetic field terminates the fall of the dispensed articles and suspends the articles therein. Consequently, the suspended articles are presented for use in the open space between the magnets without the use of constricting support means such as a container aperture or a trough. Also, the articles 11—11 are dispensed one at a time so that the number of articles presented for use within the magnetic field may be precisely controlled.

Thus, there has been described a preferred and other exemplary embodiments of a magnetic article dispenser. Alternative embodiments will be readily achieved by those skilled in the art. Accordingly, the scope of the invention is limited only by the appended claims.

What is claimed is:

1. A dispenser for magnetizable articles, comprising:
a stationary cylindrical outer shell having an inner surface, the shell having an axial slot formed therein for passage of the articles;
a cylindrical article container rotatably mounted within the shell, the container having at least one axial slot therein for receiving an article and moving the article along the inner surface of the shell to deliver the articles to the shell slot for dispensing therefrom upon rotation of the container; and
magnetic means establishing a magnetic field intersecting the paths of the dispensed articles for terminating the fall of the dispensed articles and suspending the articles.

2. A dispenser for magnetizable articles, comprising:
a base;
a cylindrical shell affixed to the base, the shell having an axial slot for passage of the articles;
a cylindrical article container concentric with and rotatably mounted within the shell, the container having a side wall and end walls and having a knob extending from at least one end wall for rotating the container within the shell and having at least one axial slot for passage of the articles to deliver the articles one at a time to the shell slot for dispensing therefrom upon rotation of the container; and
a pair of spaced magnets affixed to said base proximate the end points of the shell slot, the magnets providing a magnetic field in the space therebetween for intersecting the paths of the dispensed articles and suspending the articles in the space.

3. The dispenser of claim 2 wherein an aperture is formed in the one end of the cylindrical container for access to the interior of the container, and wherein the knob is releasably affixed to the one end of the container for closing the aperture.

4. The dispenser of claim 2, the cylindrical container having a hollow hub extending from the one end thereof communicating with the interior of the container for supplying articles to the container, and the knob being releasably attached to and closing the hollow hub.

5. The dispenser of claim 2, further comprising:
a pair of covers enclosing the ends of the shell, each cover having a central aperture;
the cylindrical article container having hubs extending from the ends thereof journaled within the cover apertures; and
at least one of the hubs having an aperture formed therein communicating with the interior of the container for access to the container and having the knob releasably attached thereto for capping the aperture and rotating the cylindrical article container within the shell.

6. The dispenser of claim 2 wherein the container side wall and the shell are transparent.

* * * * *